United States Patent
McRae

(10) Patent No.: US 9,436,035 B2
(45) Date of Patent: Sep. 6, 2016

(54) METHODS AND APPARATUS TO CONSTRUCT AN ULTRATHIN DISPLAY PANEL

(71) Applicant: Vizio Inc, Irvine, CA (US)

(72) Inventor: Matthew McRae, Irvine, CA (US)

(73) Assignee: Vizio, Inc, Irvine, CA (US)

( * ) Notice: Subject to any disclaimer, the term of this patent is extended or adjusted under 35 U.S.C. 154(b) by 309 days.

(21) Appl. No.: 13/789,430

(22) Filed: Mar. 7, 2013

(65) Prior Publication Data
US 2014/0254141 A1    Sep. 11, 2014

(51) Int. Cl.
*G02F 1/1335*    (2006.01)
*G09F 13/04*    (2006.01)

(52) U.S. Cl.
CPC ..... *G02F 1/133602* (2013.01); *G09F 13/0413* (2013.01); *G02F 2202/022* (2013.01)

(58) Field of Classification Search
CPC ............... G02F 1/0105; G02F 2001/133342; G02F 2001/133314; G02F 2202/022; G02F 1/133602; G09F 13/0413; G09F 2013/225

USPC ..................... 349/65, 69; 362/97.2
See application file for complete search history.

(56) References Cited

U.S. PATENT DOCUMENTS

| | | | |
|---|---|---|---|
| 2003/0122996 A1* | 7/2003 | Cho | 349/65 |
| 2006/0187385 A1* | 8/2006 | Liao et al. | 349/114 |
| 2011/0141402 A1* | 6/2011 | Hayashi | 349/65 |
| 2012/0206680 A1* | 8/2012 | Onishi | G02F 1/134336 349/122 |
| 2013/0286682 A1* | 10/2013 | Lin | G02B 6/0055 362/609 |

* cited by examiner

*Primary Examiner* — Karabi Guharay
(74) *Attorney, Agent, or Firm* — Law Office of Scott C Harris, Inc

(57) ABSTRACT

A display system, with a structural part, including a rear panel, and a light emitting device physically attached to the rear panel over a surface of the rear panel, where the surface of the rear panel comprises the entire surface to be illuminated by the light emitting device and a pixelated spatial light modulator part, coupled between the light emitting device, and a viewing area, modulating a light created by said light emitting device.

8 Claims, 5 Drawing Sheets

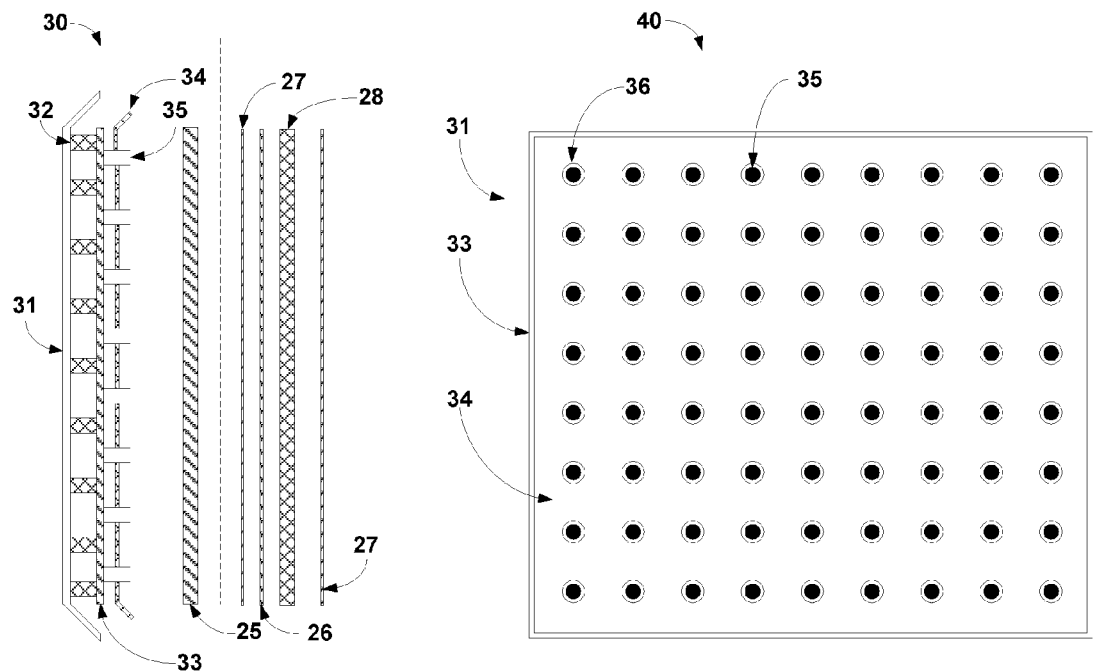
Fig. 6
Fig. 7
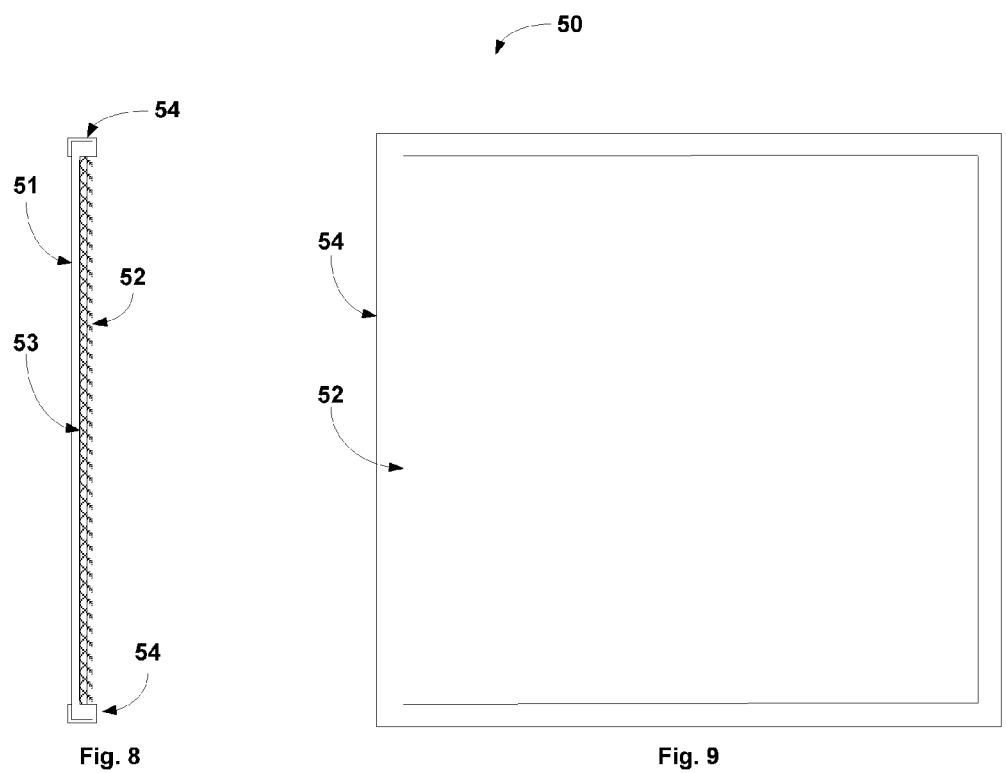
Fig. 8
Fig. 9

METHODS AND APPARATUS TO CONSTRUCT AN ULTRATHIN DISPLAY PANEL

BACKGROUND

Current TV/Video backlighting systems come in various types.

Edge Lit Backlighting Systems

Current LED display panels require that light be directed through the edge lit panel, reflected off of the back surface of the panel and emitted out of the front surface of the panel. The LCD panel itself consists of a matrix of very small, referred to as pixel, openings also referred to as LCD gates. When a gate is switched open, light passes through until the gate is switched off. In color displays, each pixel is composed of three sub pixels which are Red, Blue, and Green. When all three sub pixels are switched on, the three colors appear to be emitted from the same point and the eye sees white light. When the sub pixels are switched on and off for various time periods the light emitted from the three sub pixels appears as various colors.

Edge lit back light systems are formed of one or more light guides, also called light pipes, and various other plastic sheets or films and air gaps to further direct the light from the light guide(s) and diffuse the light before it is allowed to enter the LCD panel. FIG. 5 shows the various components of an edge lit backlight assembly and its associated LCD panel assembly.

Edge lit display systems are generally thinner and weigh less than direct LED back light systems.

Direct LED Backlighting Systems

Direct LED backlight systems typically have an array of LEDs mounted on a printed circuit board (PCB) with a reflective sheet or layer residing on the top side of the PCB through which the LEDs protrude.

Because of the greater number of LEDs used in a direct LED backlight as opposed to the smaller number of LEDs used in an edge lit backlight, the amount of power used is greater and the amount of heat generated by the LEDs is greater. Direct LED backlight assemblies are also substantially thicker than edge lit LED backlight assemblies.

FIGS. 6 and 7 are depictions of direct LED backlight systems. In FIG. 6, components to the left of the dashed vertical line comprise the direct LED backlight assembly. To support the weight of the direct LED backlight assembly, a rigid sheet metal support 31 is used as a mounting structure. Some direct LED backlights have standoffs 32 between the sheet metal support 31 and PCB 33. Light reflector 34 resides in front of PCB 33 to reflect any stray light emitted by LEDs 35. FIG. 7 depicts the reflector sheet 34 with holes 36 to allow LEDs 35 to protrude through reflector 34. A diffuser 25 resides in front of LEDs 35 to further blend and eliminate bands of light from the array of LEDs 35.

SUMMARY

The thickness of display devices, be they mobile devices or stationary devices, is dependent on the internal LCD pixel gate array and the backlight system. Current televisions, tablet computers and other mobile devices generally contain backlighting systems that use LEDs for the source of emitted light. LED backlighting systems are typically either edge lit or direct LED back lit.

A simpler apparatus and system is needed that is less expensive, has a lower parts count, is thinner and weighs less than either edge lit backlight systems or direct LED backlight systems and more power efficient than either.

The present invention contains systems and apparatus' to reduce the thickness and weight of flat panel display screens currently in use for devices such as televisions, desktop and laptop computer displays, tablet computers, appliance and consumer electronics devices, PDAs, mobile devices such as cell phones and wired and wireless telephones, instrument displays for vehicles and various test equipment devices, large commercial display such as stadium displays, add on lightings such as television back directed lighting and bezel lighting, and other various lighting through LCD display panels.

BRIEF DESCRIPTION OF THE DRAWINGS

FIG. 6 is a depiction of a typical LED direct backlight assembly with its supporting structure and a typical LCD panel. Note that the vertical dashed line separates the components belonging to the LED direct backlight assembly (to the left) and the components belonging to the LCD panel (to the right).

FIG. 7 is a depiction of the front view of a typical LED direct backlight showing the holes 36 in the reflector sheet 34.

FIG. 8 is a depiction of an ultrathin FIPEL backlight and LCD panel assembly embedded in the back supporting panel.

FIG. 9 is a depiction of a front view of an ultrathin FIPEL backlight and LCD panel assembly.

DETAILED DESCRIPTION

The present invention is based on Field-Induced Polymer Electro-Luminescence (FIPEL) technology. FIPEL was developed as an area lighting device that produces larger quantities of light for a given size panel than previous electro-luminescence (EL) panels which are well known in the art. FIPEL panels operate on alternating current. The frequency of the current is higher than 60 or 50 Hz normally used to power EL panels.

Figure 1:
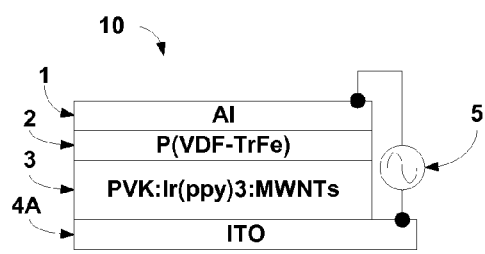
FIG. 1 is a depiction of an asymmetrical (single dielectric layer) FIPEL light emitting device which emits light only from its front surface.
Figure 3:
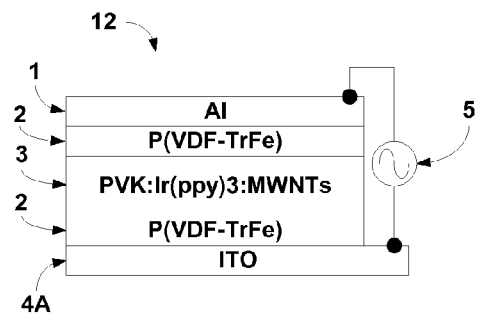
FIG. 3 is a depiction of a symmetrical (dual dielectric layers) FIPEL light emitting device which emits light only from its front surface.

FIPEL panels are simple and inexpensive to construct. Typical configurations for FIPEL panels are shown in FIGS. 1 and 3. Note the differences between the two panels.

Typical Device Construction

Figure 2:
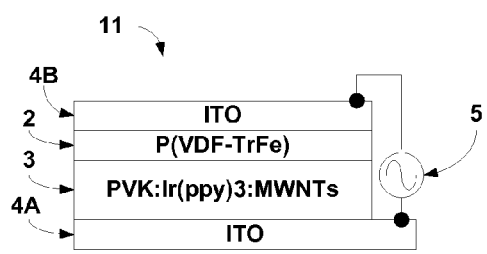
FIG. 2 is a depiction of an asymmetrical (single dielectric layer) FIPEL light emitting device which emits light from its front and back surfaces.
Figure 4:
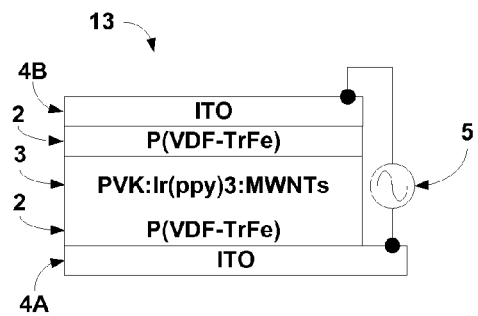
FIG. 4 is a depiction of an asymmetrical symmetrical (dual dielectric layers) FIPEL light emitting device which emits light from its front and back surfaces

FIGS. 1 and 2 illustrate single dielectric FIPEL devices and FIGS. 3 and 4 illustrate dual dielectric FIPEL devices. The differences between the two groups deal with the direction of emitted light. The basic construction of FIPEL devices is discussed in the following.

Lab quality FIPEL devices are generally fabricated on glass substrates with various coatings such as aluminum and Indium tin oxide (ITO). ITO is a widely used transparent conducting oxide because of its two chief properties, its electrical conductivity and optical transparency, as well as the ease with which it can be deposited as a thin film. Because of this, ITO is used for conducting traces on the substrates of most LCD display screens. As with all transparent conducting films, a compromise must be made between conductivity and transparency, since increasing the thickness and increasing the concentration of charge carriers will increase the material's conductivity, but decrease its transparency. The ITO coating used for the lab devices discussed here is approximately 100 nm. In the figures the ITO coated glass substrates are identified by the reference number 4A 6 throughout.

The other substrate 1 is aluminum (Al) deposited on a glass substrate. The resulting thickness of the Al deposition is sufficient to be optically opaque. The AL deposit on the glass substrate acts as an electrode and reflector to ensure light from the emissive layer (reference number 3) is directed through the ITO substrate layer (reference number 4A 6) for devices illustrated in FIG. 1 and reference number 4B in FIG. 3.

Each device includes a dielectric layer(s) identified by the reference number 2 throughout. For the lab devices the dielectric layer is deposed on the opposite side of the top substrate layer of either Al (FIGS. 1 and 3) or ITO (FIGS. 2 and 4).

The dielectric layer is composed of a copolymer of P(VDF-TrFE) (51/49%). The dielectric layer is generally spin coated against the glass side of the top layer (insulated side) and the ITO (conductive) side of the bottom glass substrate.

The emissive layer (reference number 3 throughout) is composed of a mix polymer base of poly (N-vinylcarbazole):fac-tris(2-phenylpyri-dine)iridium(III) [PVK:Ir(ppy) 3] with Multi Walled Nano Tubes (MWNT). The emissive layer coating is laid onto the dielectric layer to a depth of approximately 200 nm. For the lab devices with the greatest light output the concentration of MWNTs to the polymer mix is approximately 0.04% by weight.

When an alternating current is applied across the devices shown in FIGS. 1 and 2 (asymmetrical devices) and 3 and 4 (symmetrical devices), the emissive layer emits light at specific wavelengths depending on the frequency of the alternating current. The alternating current is applied across the conductive side of the top layer (reference number 1 and 4B) and the conductive side of the bottom layer (reference number 4A). Light emission comes from the injection of electrons and holes into the emissive layer. Holes follow the PVK paths in the mixed emissive polymer and electrons follow the MWNTs paths. Signal generator 5 may be fixed, as to the frequency it provides to a FIPEL device or it may be control by a computer where the frequency is determined based on algorithms and data contained within content that will be displayed.

Carriers within the emissive layer then recombine to form excitons, which are a bound state of an electron and hole that are attracted to each other by the electrostatic force or field in the PVK host polymer, and are subsequently transferred to the Ir(ppy)3 guest, leading to the light emission.

Modern LCD digital televisions have undergone an evolution of back light systems starting with Cold Cathode Florescence Light sources, to LED scanning edge lit systems to non-scanning LED edge lit systems. LED Edge Lit backlights are formed of one or more panels that function as light guides or light pipes in that they control the direction of light emitted into the light guide panel and change the light direction such that it is emitted out the front of the light guide.

Figure 5:
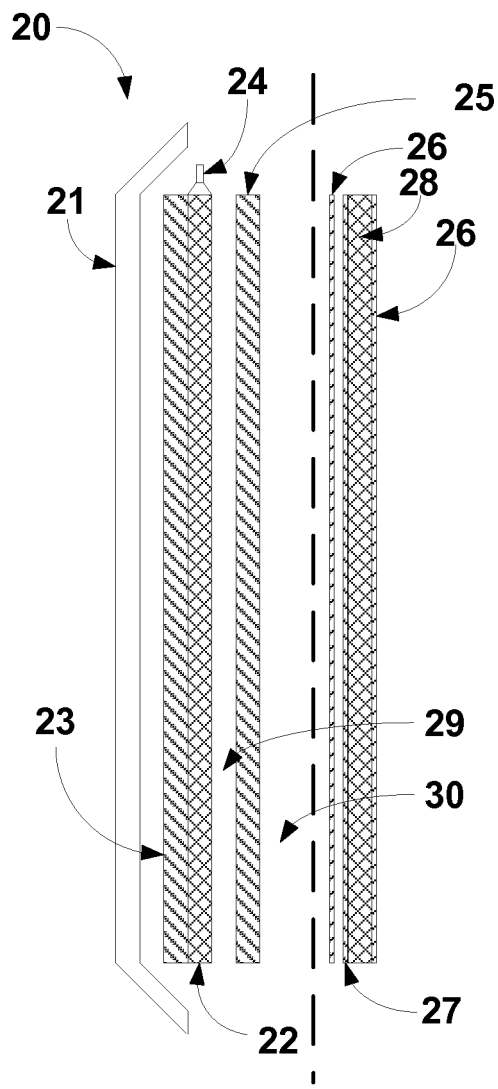
FIG. 5 is a depiction of a typical edge lit LED backlight assembly shown with a typical LCD panel. Note that the vertical dashed line separates the components belonging to the LED backlight assembly (to the left) and the components belonging to the LCD panel (to the right).

An edge lit LED backlight system 20 generally has one or more LEDs as shown in FIG. 5. In this depiction of an edge lit backlight system, note that object 21 is a support structure to which the components are fastened. The fastening devices for the panel are not shown in this depiction for the sake of clarity. Component 22 is a clear plastic panel such as polycarbonate. A LED backlight system may be formed of several narrow panels or a single panel that is the size of the LCD panel assembly 26-27-28.

While the embodiments described the use of a LCD panel, it should be understood that any spatial light modulator can be used in place of the LED panel.

An LED 24 is shown at the edge of the panel with a reflector cone. An air gap separating the LED from panel 22. Panel 22 will generally have some reflective surface, such as a reflective tape (not shown), attached to all of the edges except for that area in front of LED 24 which is the area covered by the air gap. An air gap is used between the LED and the edge of panel 22 to allow more emitted light to enter panel 22.

Panel 22 will also generally have a reflective back surface to redirect light attempting to exit panel 22 at the back of the panel. The reflective surface is depicted as object 23. Object 23 may be a reflective film or a reflective panel with microlens and/or reflective structures such as lenses and prisms molded into its back surface. Micro lens and micro prisms are well known in the art for reflecting and directing scattered light in a known direction. Object 23 improves the efficiency of light guide panel 22 to emit light toward object 25 which is a diffuser panel.

Light being emitted by light guide panel 22 may have distortions such as rings, lines or bands of brighter and darker light due to light being scattered in patterns in light guide 22. Diffuser 25 scatters light entering the surface between LED light emitter 24 and diffuser 25. Note also that an air gap may be present between light guide 22 and diffuser 25 to further allow light emitted from light guide 22 more of an opportunity to mix and soften the edges of light patterns.

Diffuser 25 scatters the light into multiple directions further mixing it into a homogenous beam that is emitted out of the opposite surface of diffuser 25 toward the LCD panel assembly 26-27-28.

The LCD panel is made up of LCD gates which represent the pixels on a LCD display panel. Each pixel is further composed of three sub-pixels. A colorizer film 27 is placed on the back of LCD panels. The area of the colorizer film 27 that resides behind each pixel will be colored either red, blue or green so that white light from the back light system that enters the sub-pixel will be colored. This innovation reduces the number of LEDs needed to provide light from the back light system. In the past, backlights contained red, blue and green LEDs that were strobed in a time sequential manner so that LCD gates had to be turned on and off three times as often as they are with sub-pixels receiving colored simultaneously.

LCD gates that make up the LCD panel are able to pass or not pass light based on a strand of polarized material in the gate that is rotated when a charge is placed across the individual gate. So as to pass a maximum amount of light through the gate, the light entering needs to be polarized to the same polarity as the gate. Element 26 of LCD panel 26-27-28 is a polarization film that ensures that light entering LCD panel 26-27-28 is properly polarized.

As light leaving or being emitted from the LCD gates is still polarized, second polarization film, also referenced as 26, is placed on the front surface of LCD panel 28. This polarization film cleans up any scattering of light leaving the front of the LCD gates and improves the viewing angle of the display panel.

The inventor recognizes that FIPEL light emitting panels provide the opportunity to replace LED edge lit back lighting systems with a lower cost and lower parts count device. The typical LED edge lit backlight assembly as shown in FIG. 5 has a light guide/pipe, an array of LEDs mounted to one of the edges of the assembly, a back reflector object 23 to redirect scattered light back through the light guide 22, a diffuser 25 to blend the light from the light guide 22 and two air gaps shown as 29 and 30.

A first FIPEL backlight system as shown in FIG. 6 is formed of a FIPEL module 31, which emits light directly from its transparent surface. The FIPEL module can be any of the modules shown in FIGS. 1 through 4. The FIPEL modules need no separate reflective sheet or device module at its back to redirect scattered light. FIPEL modules do not need reflective devices around the edges of the module to redirect light that would otherwise emit from the edges as does the LED edge lit backlight system. There is no LED array needed to inject light into the module. FIPEL module 31 emits light only in one direction evenly from its flat emissive surface. The emitted light contains no distortion pattern, so diffuser panel 25 is not necessary nor are air gaps 29 and 30, normally found on each side of the diffuser as shown in FIG. 6.

In Total the FIPEL panel contains one component. The typical LED edge lit backlight assembly has 6 components including the two air gaps and the additional supporting structure (not shown) required for the air gaps.

Figure 10:
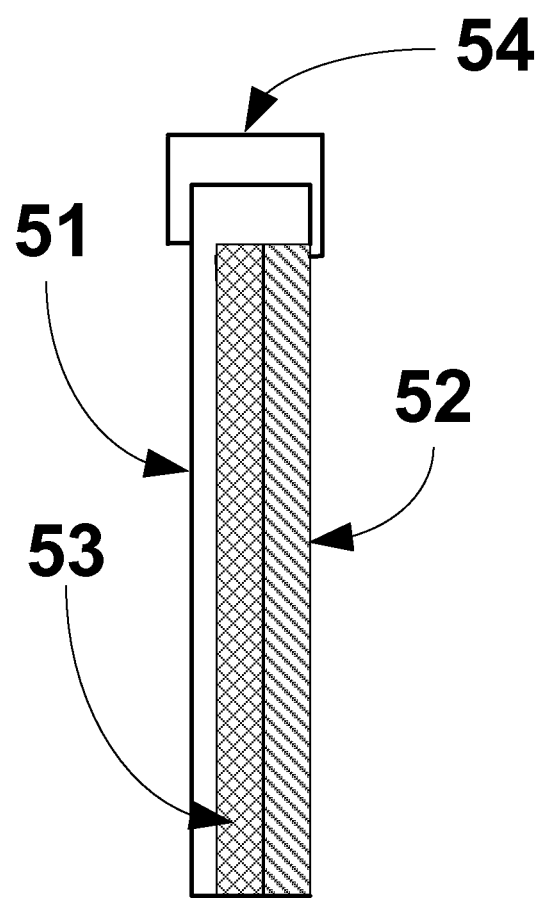
FIG. 10 is a depiction is a magnified edge view of an ultrathin FIPEL backlight and LCD panel assembly embedded in the back supporting panel.

FIPEL panel 53 is shown mounted directly to LCD panel 52 (FIGS. 8 and 10). LCD panel 52 includes polarizer film 26, color film 27 not shown for the sake of clarity. This further decreases the parts count for supporting structure 51 and 54.

A further refinement of FIPEL backlight systems is shown in FIG. 7. In this embodiment, the first polarization film 26 is attached to the emitting surface of FIPEL device 4A of FIG. 5. The polarization film 26 is part of the FIPEL device manufacturing process and become another part of the basic assembly. The addition of polarization film 26 to the FIPEL device makes assembly of the LCD panel simpler with only the color film to be aligned and bonded to the LCD panel.

A further refinement of FIPEL backlight systems includes the 4A substrate plated with ITO on the side facing the PVK layer 3 polarized on the emissive or front side facing the color film between the LCD panel and the FIPEL device resulting in the elimination of polarization film 26 normally residing between the light emitting assembly and color film 27.

Both of the FIPEL devices 31 and 32 shown in FIGS. 6 and 7 are substantially thinner than a LED edge lit backlight assembly. If we assume that the two glass substrates are 0.020 each in thickness and the Al coating is 100 nm, the dielectric layer is 1,200 nm, the emission layer is 200 nm and the ITO layer is 100 nm. The total resulting thickness is approximately 0.040 inch, more generally less than 0.1 inch thick.

LED edge lit assemblies, depending on the reflector sheet behind the light guide can approach 0.250 inch which is some six times thicker than the FIPEL device of an embodiment.

The differences between the two technologies can allow for the FIPEL device/module to be mounted directly to the back surface of the LCD panel. This simplifies the manufacturing process (less manual touching of the panel) and allows for the plastic back of the display screen to become the supporting device with less or no structural metal resulting in a weight savings and a substantially thinner product.

This can also be used with the new Samsung screen technology called Electro-wetting Displays which may have backlights or have only have reflective back surfaces that reflect ambient light. A FIPEL panel of the type shown in FIGS. 8, 9 and 10 can provide both. When the FIPEL panel is active with this type of display, the display is using a backlight. When the FIPEL panel is turned off, the reflective back surface of the FIPEL panel is reflective. This gives the Electro-wetting Display the best of both worlds.

FIPEL Direct Backlight Assembly

A first embodiment of the FIPEL Direct Backlight Assembly is disclosed. An ultrathin FIPEL backlight and LCD panel assembly is depicted in FIGS. 8, 9 and 10. A typical lab quality FIPEL panel can be as thin as 0.041 inch and the thickness of a typical LCD panel is approximately 0.091 inch. More generally, the light emitting devices can be less than 0.1 inch in thickness. Since FIPEL panels emit light equally across the area of the panel, a diffuser is not needed.

FIG. 8 shows a display panel back piece 51 with a depression area that is the depth of the FIPEL panel and the LCD panel. FIG. 10 is a magnified view of the upper portion of the panel edge for clarity. For this embodiment, FIPEL panel 53 is physically touching LCD panel 52. In some embodiments, the panels may be bonded together and in yet another embodiment they may share connecting substrates. Any of the structural materials described herein, including the back piece 51, can be formed of plastic or any other suitable structural material.

With FIPEL panel 53 and LCD panel 52 residing in back piece 51, a bezel 54, shown in FIG. 9 retains the panels within the depression and provide some additional structural rigidity. These depictions of FIPEL panel 53 and LCD panel 52 do not, for the sake of clarity, show polarizer sheets 26 nor color film 27 as depicted in FIG. 5.

The instant invention provides a new and unique method and apparatus for building ultrathin, lower cost, and lighter weight LCD display panels.

Figure 11:
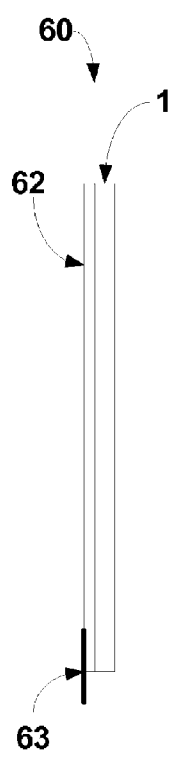
FIG. 11 is a depiction of a FIPEL backlight assembly with the conductor lead used to deliver half of the powering signal from the signal generator 5 to the conductive plating 62 on the back of substrate 1
Figure 12:
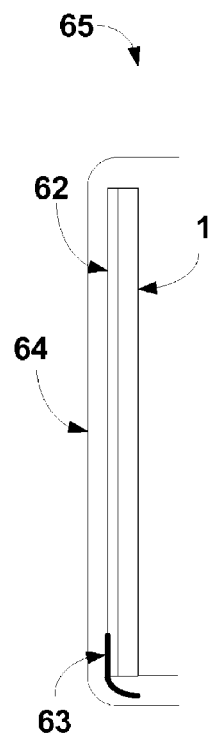
FIG. 12 is a depiction of the conductive lead 63 being conformed to a curve in the back shell 64 of the housing.
Figure 13:
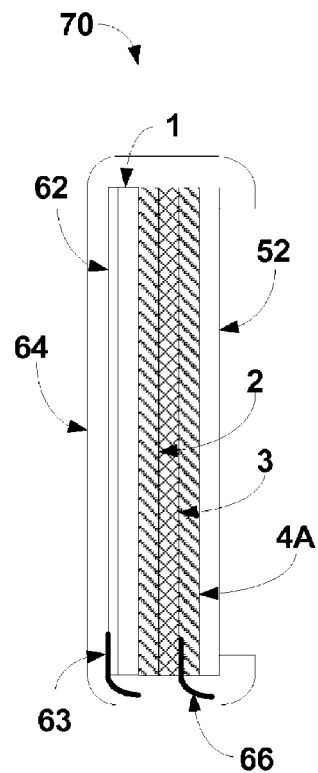
FIG. 13 is a depiction of the conductor lead 66 used to deliver the other half of the powering signal from the signal generator 5 that is connected to the ITO Plating on the emissive side of substrate 4A.

A second embodiment of the FIPEL Direct Backlight Assembly is disclosed where a refinement is made that reduces the parts count for the assembly. This embodiment makes use of a single dielectric device as shown in FIG. 1. In this embodiment, substrate 1 is plated with a conductive reflective coating 62 such as such as but not limited to Aluminum. In FIGS. 11, 12 and 13 the plated reflective coating is shown as 62 for clarity. In the present embodiment the substrate becomes part of the back case of the display. Now referencing FIG. 11, assembly 60 shows the back panel of the device where 1 is the substrate and 62 is the reflective conductive coating. The back coating may be any conductive material such as, but not limited to, Aluminum. Substrate 1 is a non-conductive material such as, but not limited to, PET or other suitable non-conductive material. 63 is the signal or current line attached to reflective back coating 62.

Now referencing FIG. 12, object 64 is an over coating or overshot of a plastic type material to add structural integrity to assembly 65. Note that Signal or current line 63 has been made to conform to the contour of over coating 64 which is now the back shell for the display. The overshot material may be any plastic material such as, but not limited to, glass filled polycarbonate.

The balance of the FIPEL device shown in FIG. 1 is then added to the device shown in FIG. 13. Note that FIG. 13 shows dielectric layer 2, the PVK MWNTs emissive layer 3 and the ITO layer 4A as well as LCD panel 52. The FIPEL device has now become a layer in the back shell of the display as shown in FIG. 13.

Note again that in FIG. 11 object 63 is the conductor lead used to deliver the signal to the conductive plating 62 on the back of substrate 1. FIG. 12 FIG. 13 also shows the signal conductor emerging from the assembly after the substrate is overshot to add structural integrity. FIG. 13 shows object 66 which is the conductor that is connected to the ITO Plating on the emissive side substrate 4A. FIG. 13 also shows that additional overshot material is added to 64 to encase the top and bottom of the integrated backlight and LCD panel thus forming the complete display.

In a slightly different embodiment, the material used for overshot coating 64 may be optically transparent and reflective back coating may be some conductive back coating such as ITO so that light is emitted from the back of the display and images are emitted from the front of the display.

In yet another embodiment, a second LCD panel may reside between the 62, (coated substrate) and 64 overshot coating so that 2 different sets of images may be emitted from both the front and back of the display.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended for cover any modification or alternatives which might be predictable to a person having ordinary skill in the art. For example, other sizes and thicknesses can be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, display port, or any other form. This may include laptop or desktop computers, and may also include portable computers, including cell phones, tablets such as the IPAD™, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A display system, comprising:
   a structural part, including a plastic material forming a rear panel, and
   a light emitting device physically attached to the rear panel over a surface of the rear panel, including a conductive reflective coating connected directly to the rear panel and a non-conductive layer, attached to said conductive reflective coating, the conductive reflective coating connected directly to the rear panel and a non-conductive layer, attached to said conductive reflective coating attached to said rear panel to add structural integrity to the rear panel,
   a signal line, connected to said conductive reflective coating and curved to conform to a curved contour of a curved side portion of said structural part, a dielectric layer connected to said non conductive layer, a light emissive layer connected to said dielectric layer, and a transparent conductive layer over the light emissive layer, with a second signal line connected thereto,
   the light emitting device emitting light across its area when electrically energized between said signal line and said second signal line; and
   a pixelated spatial light modulator part, connected directly to the light emitting device, and modulating a light created by said light emitting device to create light in a viewing area.

2. The system as in claim 1, wherein said spatial light modulator is liquid crystal or an electro-wetting device.

3. The system as in claim 1, wherein said light emissive layer is a flexible material.

4. The system as in claim 1, wherein said structural part includes a flat surface and an indentation formed in the flat surface below the flat surface, where the indentation holds the entirety of the light emitting device.

5. The system as in claim 3, wherein the spatial light modulator also extends across said flat surface, and is also located entirely in said indentation.

6. The system as in claim 1, wherein the rear panel is optically opaque.

7. The system as in claim 1, wherein the rear panel is optically transparent.

8. The system as in claim 7, wherein the light emitting device emits light from both sides of the rear panel.

* * * * *